(No Model.)

A. MUIR.
CHUCK.

No. 493,231. Patented Mar. 7, 1893.

Witnesses
C. E. Ashley
H. W. Lloyd.

Inventor
Alfred Muir
By his Attorneys
Wilcox & Barkley

UNITED STATES PATENT OFFICE.

ALFRED MUIR, OF MANCHESTER, ENGLAND.

CHUCK.

SPECIFICATION forming part of Letters Patent No. 493,231, dated March 7, 1893.

Application filed June 8, 1892. Serial No. 435,954. (No model.)

*To all whom it may concern:*

Be it known that I, ALFRED MUIR, a subject of the Queen of Great Britain, and a resident of Manchester, in the county of Lancaster, England, have invented certain new and useful Improvements in Chucks, of which the following is a specification.

This invention is an improvement upon that class of chucks wherein split bushings are used to hold the tool. Heretofore, chucks have been made on the principle of the carpenter's brace where pivoted or flexible jaws free at one end and fast at the other have been used to hold bits and the like, but it is apparent that there are great objections to this principle when applied where heavy work is required to be done, owing to the fact that it is not possible to firmly hold the bit, drill or what not. One reason for this is the difficulty of applying sufficient power at the point of holding; another is that the harder the jaws are forced against the shank of the bit or drill, the more does the contact between them approach a circumferential line of the shank; the holding surface is not distributed over the whole length of the shank or any considerable part thereof. It has also been proposed to use a split tapering bushing in a tapering socket of a spindle, and to move the same by a screw nut fitting in a slot in the spindle and engaging a screw thread on the small end of the bushing, a small handle on the nut being used to turn the same. But I am not aware that this construction ever entered into use, extensive or otherwise.

In my invention the holding pressure is distributed over the whole of that part of the shank within the split tapered bushing; this pressure may be as great as desired; and it may be varied instantly by simple means.

My invention consists of a tapered split holding bushing, preferably having one or more external longitudinal grooves, and having means at its larger end, for engagement with a collar or nut. In its preferred form, my invention consists of a tapered split holding bushing having external longitudinal grooves and a screw thread on a cylindrical extension at the larger end of the same, and a nut or collar having differential screw threads, one for engagement with said thread on the bushing and the other for engaging the screw threads usually found on lathe spindles. The purpose of the longitudinal grooves is to give flexibility in longitudinal lines or planes of the bushing.

The preferred form of my invention is shown in the accompanying drawings, forming part of this specification, in which—

Figure 1:
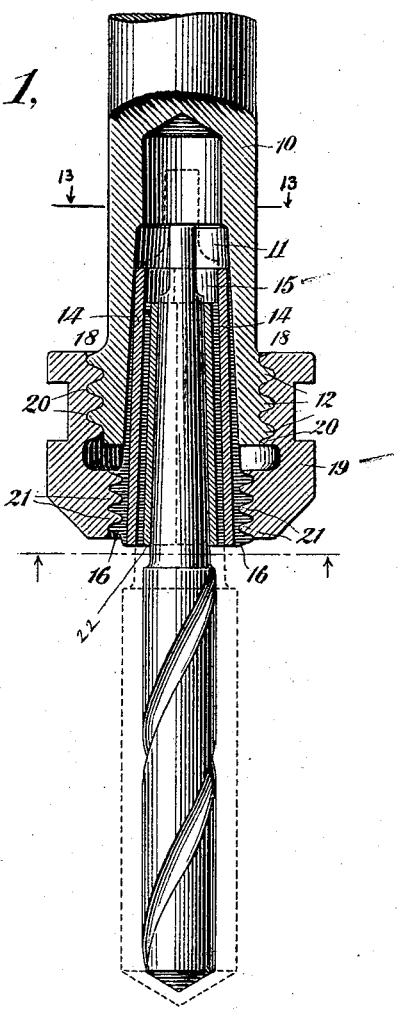
Figure 3:
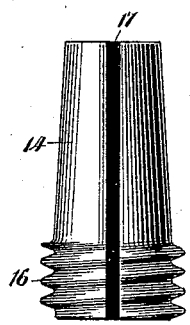
Figure 4:
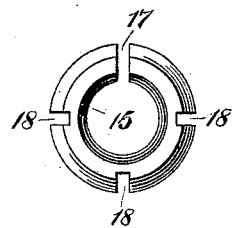
Figure 2:
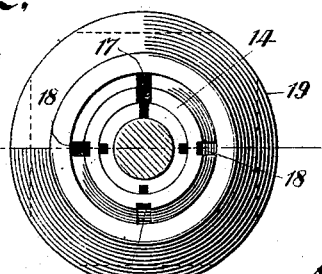

Figure 1, is a sectional elevation of part of the spindle-bearing of a machine or machine tool. Fig. 2 is a plan view looking from the under side thereof. Fig. 3 is an elevation of the split bush, and Fig. 4 is an end view of the same.

I only show the outline of part of the spindle-bearing of a machine or machine tool, this being all that is necessary for the purpose of explanation.

Referring to Figs. 1 and 2, the reference 10 marks the spindle-bearing having a tapering hole 11 extending longitudinally thereof, and a screw thread 12 on the exterior thereof at one end. This spindle may be integral with or suitably held in the bearing 13 shown. Reference 14 marks the split bush or tool holder having a tapering body adapted to fit the taper hole 11, and having a cylindrical or tapering hole or perforation (shown as tapering, see reference 15) extending longitudinally there-through and having an exterior screw-thread 16 thereon. The said bush 14 has a longitudinal slit 17 extending from the outer side thereof to the perforation 15 and communicating therewith. It is preferably provided with one or more shallow grooves 18, the slit and grooves being placed at equal or unequal distances from each other. A collar 19 provided with screw-threads 20 and 21 to engage with screw-threads 12 and 16 respectively, connects the spindle and the bush. The screw-threads 12 and 16 also 20 and 21, are of different pitch, that of screw threads 12 and 20 being the greater. By this means the collar 19 forces the bush longitudinally into the taper 11 of the spindle 10 with great power compressing the bush upon the tapered (or cylindrical) end of any suitable tool in the tapered (or cylindrical) hole 15 thereof. The collar 19 may be moved by means of a suitable wrench or lever (not shown). A reverse turn of the collar will move the shank with it and release the same from the spindle.

Instead of being connected to the spindle and bush in the manner above shown and described, the collar 19 may be connected therewith in the ways illustrated in my patent No. 441,071, dated November 18, 1890, without departing from this invention.

In case the end of the tool is of a size too small to fit or to be held by the split bush, suitable split bushings, as 22, may be used to enlarge the end of the tool so that the same may be held by the said bush 14.

What I claim, and desire to secure by Letters Patent, is—

1. The combination of a screw-threaded spindle-bearing, a tapering split holding-bushing having a screw-thread of a pitch different from that on the bearing, and a differential screw engaging said threads, substantially as described.

2. The combination of a screw-threaded spindle-bearing, a tapering split holding bushing having one or more longitudinal grooves and a screw-thread of a pitch different from that on the bearing, and a differential screw engaging said threads, substantially as described.

3. The combination of a spindle having a tapering socket and a screw-thread, a tapering split holding bushing, and a threaded collar or nut engaging said screw-threads and also engaging with said bushing, whereby the same may be moved longitudinally, substantially as described.

4. The combination of a spindle having a tapering socket, a tapering split holding bushing having a screw-thread, and a threaded collar or nut engaging said screw-threads, and also engaging with said spindle whereby the bushing may be moved longitudinally, substantially as described.

5. The combination of a spindle having a tapering socket, a split tapering holding bushing, differential screw-threads on said parts and a differential screw nut or collar to engage said parts, whereby the bushing may be moved longitudinally, substantially as and for the purpose described.

In testimony that I claim the foregoing as my invention I have signed my name, in presence of two witnesses, this 27th day of May, 1892.

ALFRED MUIR.

Witnesses:
ELLA F. BRAMAN,
W. N. WOODRUFF.